Feb. 17, 1970   J. FISCHBACH   3,495,883
TRACK AND TRACKED VEHICLE
Filed Dec. 1, 1967   6 Sheets-Sheet 1

INVENTOR.
JACOB FISCHBACH
BY
ATTORNEYS

Feb. 17, 1970     J. FISCHBACH     3,495,883
TRACK AND TRACKED VEHICLE

Filed Dec. 1, 1967     6 Sheets-Sheet 2

INVENTOR.
JACOB FISCHBACH
BY *Auslander + Thomas*
ATTORNEYS

FIG. 6
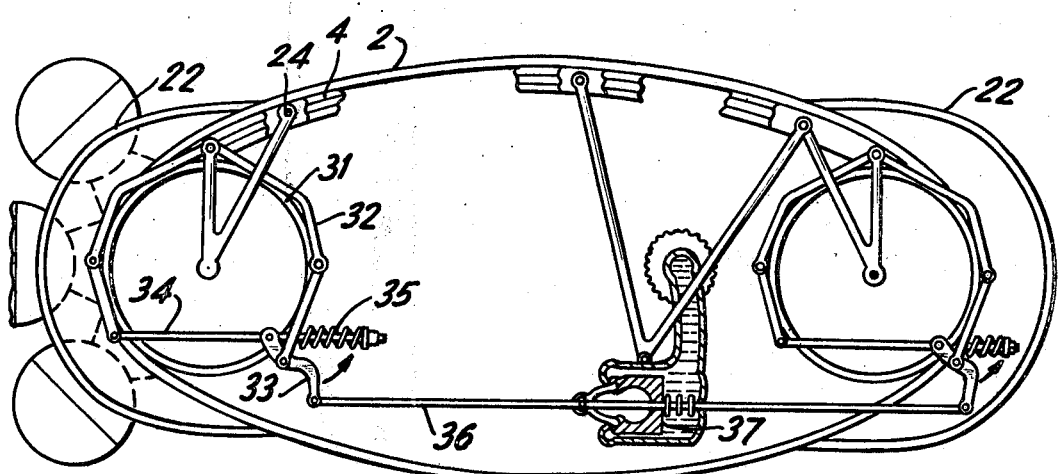
FIG. 7
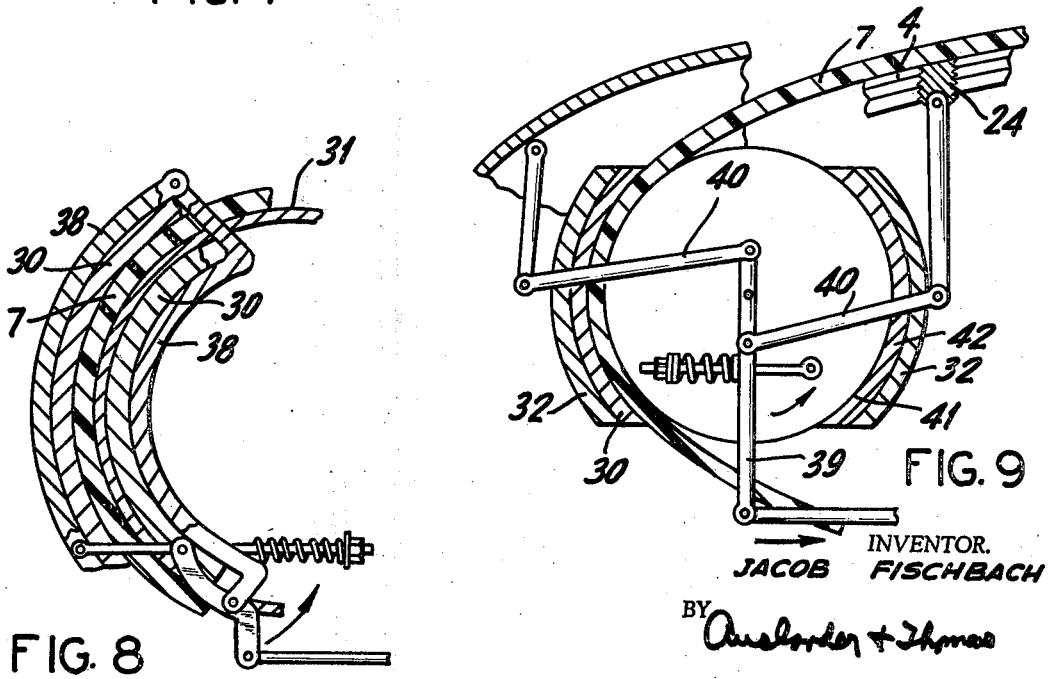
FIG. 8
FIG. 9
INVENTOR.
JACOB FISCHBACH
BY Auslander + Thomas
ATTORNEYS

INVENTOR.
JACOB FISCHBACH

ATTORNEYS

Feb. 17, 1970   J. FISCHBACH   3,495,883
TRACK AND TRACKED VEHICLE
Filed Dec. 1, 1967   6 Sheets-Sheet 5

INVENTOR.
JACOB FISCHBACH
BY *Auslander + Thomas*

ATTORNEYS

United States Patent Office 3,495,883
Patented Feb. 17, 1970

3,495,883
TRACK AND TRACKED VEHICLE
Jacob Fischbach, 3439 Knox Place,
Bronx, N.Y. 10467
Filed Dec. 1, 1967, Ser. No. 687,252
Int. Cl. B62d 55/24, 25/16; B60c 5/00
U.S. Cl. 305—9
8 Claims

ABSTRACT OF THE DISCLOSURE

The present invention provides a flexible track and a flexible track and track vehicle, wherein each flexible track generally comprises a pair of elliptical flexible members, maintained in parallel spaced apart relationship, and endless track belt mounted about the elliptical members and driven. The track vehicle includes a vehicle support frame with the flexible tracks located at the apices of two isosceles triangles having a common base.

---

The present invention relates to a track and a tracked vehicle.

Present motor vehicles ride on pneumatic tires which afford a substantially smooth ride when combined with suspension systems. While the pneumatic tire and suspension system combine to afford the resiliency desired, the wheel itself has little or no resiliency and the wheel together with the braking system usually carried on it contributes to the unsprung weight of the vehicle. While many braking systems have been devised, those which are internal of the wheel itself are limited in size to the size of the wheel. Additionally the tractive surface of the present day automotive tires is limited.

In an attempt to improve on the pneumatic tire especially in the areas above specified new widetrack and wider diameter tire and tire and vehicle combinations have been developed.

In the area of heavy vehicles where rough terrain need be encountered either tires of extremely large size have been developed, or especially in the area of defense and construction tracked vehicles have been developed. While the tracked or half-tracked vehicles have provided a means for travel in otherwise unacceptable environments, tracked vehicles of the past were severely limited. The nature of the track, that is its basic metallic construction and cleat-type arrangement provides only limited resiliency or flexibility giving a vehicle so equipped a rather uncomfortable ride. The tracks themselves are generally unacceptable for highway use since the track causes rather severe damage to existing concrete or macadam roadways. Furthermore, the tracked vehicle carries a substantial load of unsprung weight, much of which is directly attributable to the weight of the track itself.

Additionally the track arrangements presently employed have relatively complicated arrangements of driving and idler gears or gear trains which require maintenance and serve to reduce the power transmittable to the track for driving.

According to the present invention there is provided a flexible track arrangement offering greater resiliency and flexibility than found in either tracked vehicles of the past or pneumatic tires. In lieu of the solid substantially inflexible construction of wheels, the flexible track of the present invention provides a track constructed of a spring frame which if of the same height of a pneumatic tire provides a greater braking surface, and a greater area within the track for the maintaining of a braking system. Since the track is of a spring frame, the entire weight within the track is sprung.

In lieu of the endless belting of hinged steel plates found in tracked vehicles today, the flexible track of the present invention provides an outer surface which may be constructed of flexible materials heretofore employed for pneumatic tires. Where endlesst tracks presently employed envelope a front and rear drive wheel carried on a roller track frame which supports the weight of the vehicle, the flexible track of the present invention is provided with parallel aligned elliptic springs.

Where the endless tracked vehicles presently employed require in many instances dual clutch mechanisms to manipulate the tracks for steering, the flexible track of the present invention is adaptable for use with conventional steering such as used in automobiles.

While the comforts, speed and maneuverability of automobiles or the like is provided, the track of the present invention is readily adaptable for armor plating and/or amphibious uses and in the preferred embodiment, the flexible track is completely sealed.

Although greater detail with respect to specific embodiments is hereinafter described, the track of the present invention generally comprises a pair of elliptical flexible members maintained in parallel spaced apart relationship by spacer bars. The flexible members may include supplementary leaf springs mounted thereon if desired. Shock absorbing means such as telescoping shock absorbers are mounted, preferably in a triangular relationship from the central area between the flexible members, the central area of the flexible track having a mounting frame therein for the shock absorbers. Roller bearings mounted between the two elliptical frames carry the track itself, the track preferably of a pliable flexible material. The trick is preferably driven by a somewhat centrally located gear in active engagement with the central underside portion of the track.

Various braking devices are readily employable within the track body as are various steering methods.

While the flexible track configuration of the present invention is readily adaptable for use in lieu of existing tracks or tires on existing vehicles the track is especially adaptable for use with a new chassis configuration, especially adapted for high speed vehicles.

Automotive chassis arrangements generally prescribe a rectangle with the four wheels generally located near the corners of the rectangle. Although some experimentation in newer model cars has encompassed front wheel drive, the general arrangement of the present day automobiles has the steering at the front of the vehicle and the drive wheels at the rear. Therefore in turning the rear wheels act as the pivot points. So as to allow for a power division, especially during turning, a differential has been employed.

In automotive chassis arrangements employed today the pivoting or tilting and/or jarring effect of bumps or road shock, or roll and lean on turns and dipping as in hard braking, has been absorbed or counteracted almost solely by the suspension system of the automobile.

According to the new chassis arrangement of the present invention, there is provided a chassis configuration which allows for the elimination of the differential and additionally substantially lessens the strain on the suspension system to maintain chassis stability. The location of the track centers on the chassis arrangement of the present invention describes the apices of two isoceles triangles having equal dimensions and a common base and preferably the dual triangular configuration is that of two equilateral triangles having a common base. The wheel centers, or preferably the flexible track centers locations, are at the four points defined at the periphery of the conjoined triangles.

Steering is effected through pivoting of the front and rear tracks with the pivotal points for the chassis arrangement at the mid-chassis location. Not only does the foregoing configuration substantially shorten the turning radius of a vehicle, it provides a greater stability during movement. For example, in a conventional automobile a bump hit by one or more of the wheels causes transverse and/or longitudinal pivoting or tilting in various degrees with respect to the other wheels not directly affected by the bump. In the chassis arrangement of the present invention, taking a longitudinal view, the set of flexible tracks at the middle of the chassis become the pivotal points when a bump is hit by a front or rear truck. Under such circumstances, in addition to the suspension system of the flexible track which is directly affected by the bump, the track opposite the directly affected track and the pivotal middle tracks act as part of a counteracting lever with its fulcrum at the middle tracks to counteract tilting, etc. and provide stability. From the transverse viewpoint, the front and rear tracks are the pivotal points when a bump is hit by either of the side tracks. Under such circumstances in addition to the suspension of the directly affected tracks, the track opposite the affected track in combination with the central stability due to the front and rear tracks act as a counteracting lever to the shock. The counterbalancing effect can be equated with an "outrigging" arrangement and these factors provide for greater stability not only for bumps but for dipping in braking or leaning on turns.

Although such novel feature or features believed to be characteristic of the invention are pointed out in the claims, the invention and the manner in which it may be carried out may be further understood by reference to the description following and the accompanying drawings.

FIG. 6 is a detail view of a track seal.

FIG. 7 is a detail of a braking system employable with the flexible track of the present invention.

FIG. 8 is a detailed section of an alternate braking system of the present invention.

FIG. 9 is a detailed section of another alternate braking system embodiment.

Referring now to the figures in greater detail, where like reference numbers denote like parts in the various figures.

Figure 2:
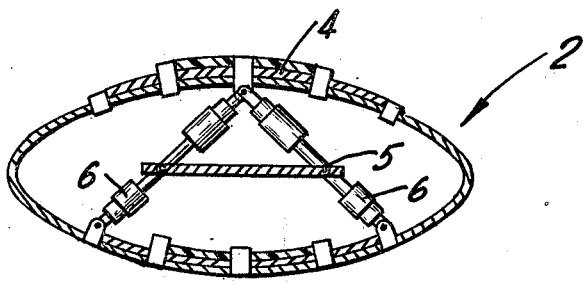
FIG. 2 is a detailed sectional view of an elliptical flexible frame member and the shock absorbing means.

In order to best describe the various components employed to construct a flexible track in accordance with the present invention, FIGS. 2–5 are details of the various major assemblies with various elements omitted for clarity. As shown in FIG. 2, the track assembly is borne on two flexible elliptic leaf spring-like members 2 which are disposed in parallel spaced apart relationship. Supplementary leaf springs 4 or supplemental leaves having spring quality may be mounted on the elliptics 2 preferably on the peripheral upper and lower edges of the elliptics 2.

A stabilizing frame 5 which is affixed to the chassis of a vehicle extends horizontally and transversely within the framework defined by the elliptics 2 and is substantially centrally located therein.

Each elliptic 2 is provided with shock absorbing interconnection with the stabilizing frame 5 and as shown in FIG. 2 four telescopic shock absorbers 6 disposed in triangular configuration so as to provide two shock absorbing connections with both the upper and lower periphery of each the elliptics 2 are preferable with the base of each shock absorber 6 mounted to the stabilizer frame 5 and the outward points of the shock absorbers 6 mounted to the inner, upper and lower periphery of the elliptics 2.

Figure 3:
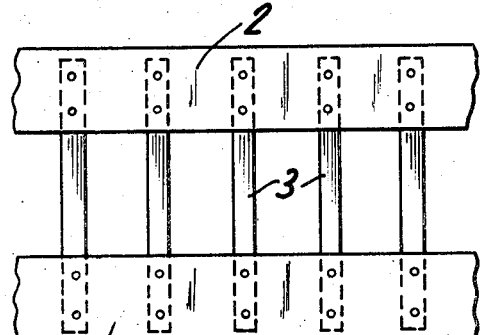
FIG. 3 is a top elevational detail view of the flexible frame joining means.

As shown in FIG. 3, the elliptics 2 are maintained in parallel spaced apart relationship by cross members 3 which preferably are affixed to the underside of the elliptics 2. A plurality of such cross members 3 are provided along the circumferences of the elliptics suitably spaced so as not to interfere with the driving or braking mechanisms hereinafter described.

Figure 4:
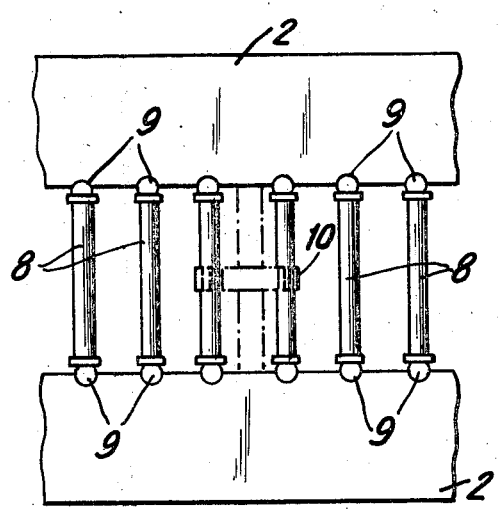
FIG. 4 is a top elevational detail view of the roller bearing means for the track of the present invention.

The track 7 rides on rollers 8 such as shown in FIG. 4. Roller bearing recesses 9 are provided along the inner edges of the elliptics 2 and are preferably plated or lined with bearing material.

Figure 1:
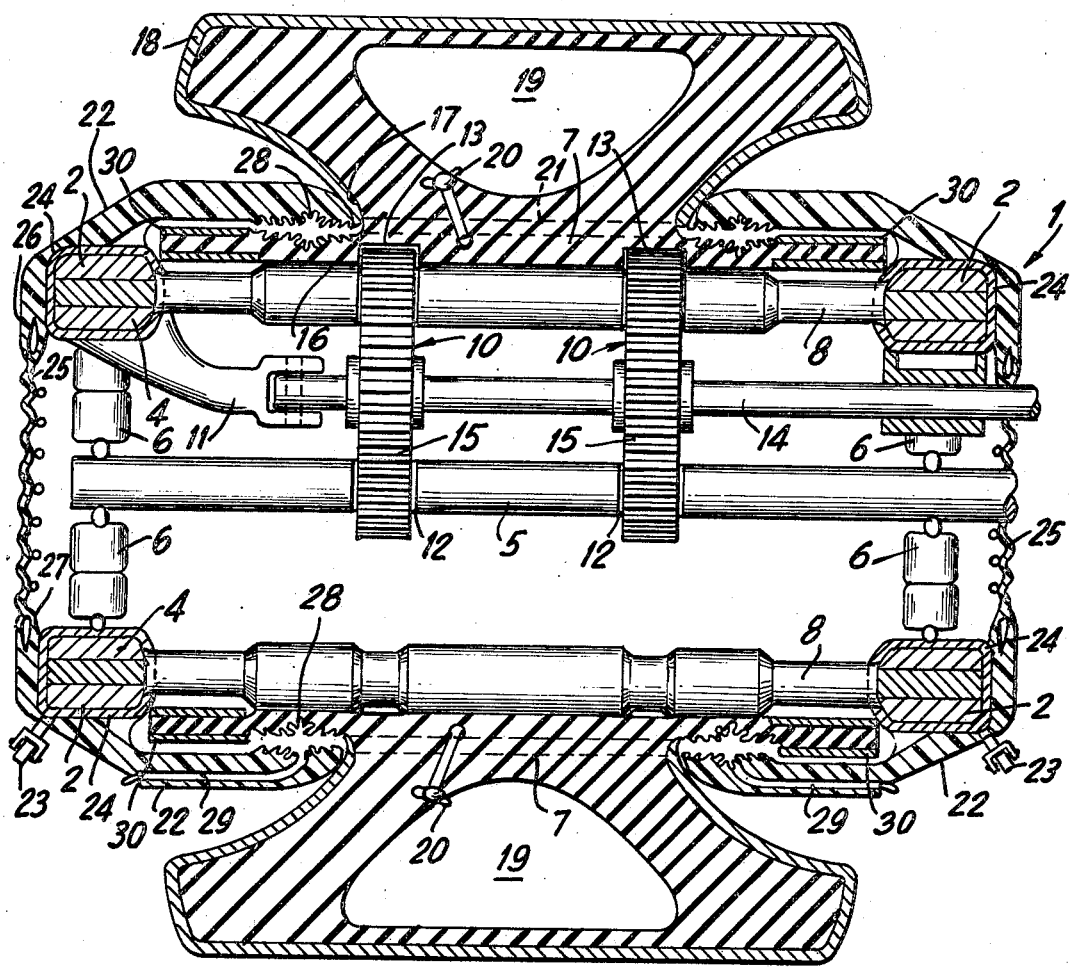
FIG. 1 is a cross sectional view of a flexible track constructed in accordance with the present invention.
Figure 5:
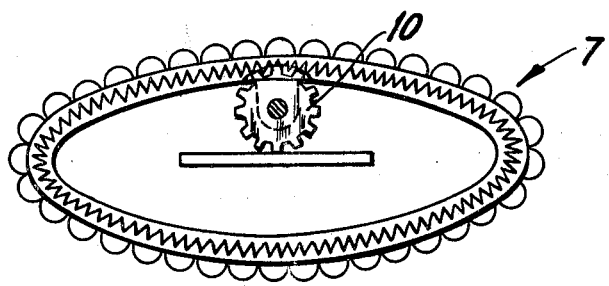
FIG. 5 is a side elevational detail view of the track drive means.

The track 7 is driven by drive gear 10 shown in FIG. 1 as a two-gear arrangement and FIG. 5 as a single gear, the gear 10 mounted within the flexible track assembly 1 by a mounting bracket 11 which is affixed to the underside of the upper section of the elliptics 2 and leaf spring 4 arrangement. In such manner, the drive gear 10 maintains a one-to-one movement relationship to the elliptics 2. The upper portion of the gear 10 is thereby exposed between the two elliptics 2 and meshes with the centrally cogged underside of the track belt to drive the track. In view of the size of the gear or gears 10, the stabilizing frame 5 may include an opening or openings 12 therethrough so that the lower portion of the gears 10 will depend therethrough.

Referring now to FIG. 1 where the interrelational details of the foregoing are shown in preferred embodiment.

The flexible track 1 constructed as described, employing two elliptics 2, with supplemental leaf springs 4, and shock absorbers 6 is mountable to a vehicle chassis by interconnecting of the stabilizer frame 5 with the chassis (not shown). The drive gears 10 are vertically mounted along a drive shaft 14 which will actuate the gears 10 to rotation. A portion of the gears 10 extends upward above the upper edges of the elliptics 2 so that teeth 15 of the gears 10 are in position to mesh with the centrally cogged underside 13 on the track 7.

The gears 10 are maintained in proper alignment and position by use of a mounting bracket 11 which is preferably flexible so as to allow for universal movement, with the mounting bracket 11 anchored to the underside of the elliptics 2 or supplemental leaves 4. As shown in FIG. 1, the bracket 11 may be the terminal receptacle for the drive shaft 14 with the interconnection of the drive shaft 14 and the bracket 11 effected by a thrust bearing arrangement.

The track 7 rides on rollers 8, with the cogged underside 13 of the track in mesh with the gears 10. The cogged underside 13 of the track 7 is preferably partly recessed within the track 7 with the gears 10 fitting within the recess.

The track 7 is preferably of a resilient material similar to materials presently employed in conventional pneumatic tires, or if desired, various fabric, metal and synthetic combinations may be employed.

As shown in FIG. 1, the track belt 7 preferably provides a substantially flat inner base 16, which includes the track teeth 13 on the underside thereof, a neck portion 17 which extends upward from the central portion of the base 16 and the support portion 18 which preferably flares outward from the neck portion 17 to provide a wider bearing surface. The support portion 18 as shown in FIG. 1 preferably includes an air chamber 19 which can be conveniently fed by valve 20.

Figure 11:
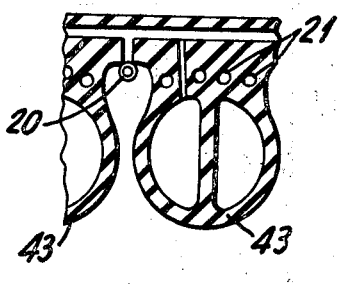
FIG. 11 is a detailed side view section of the track FIG. 1.

A plurality of dead air chambers such as dead air chamber 21 more clearly shown in FIG. 11, may be provided transversely across the neck portion 17 to increase the flexibility of the track 7 and minimize resistance of the inflated track 7 to rotation.

Greater traction is provided where a plurality of spaced apart bearing surfaces 43 are employed thereby providing the track belt 7 with the advantages of a treaded tire.

A flexible cover 22 envelops the main body portion of the flexible track arrangement 1 with the support portion 18 of the track 7 exposed. The track cover 22 may include a plurality of casters 23 mounted thereon so as to protect the track cover 22 from damage by lateral obstructions.

Spring sheaths 24 may be employed for affixation of the cover 22, the spring sheath 24 surrounding the elliptics 2 and supplemental leafs 4 except for the roller 8 socket areas, and the cross member 3 areas. The sheath 24 is preferably of a resilient material so as to add further resiliency to the flexible track 1, and the cover 24 may be affixed thereto.

A track boot 25 such as the accordian pleated flexible boot 25 shown in FIG. 1 may be provided, affixed to the sheath 24 so as to shield the sides of the flexible track 1. Access to the interior of the track may be readily provided by affixation of a boot flap 26 to the spring sheath 24 and by providing a waterproof zipper closure 27 between the boot flap 26 and the boot 25. It is preferable that all materials be waterproof.

A track seal 28 may be provided by the use of labyrinth seals such as the seal 28 shown in FIGS. 1 and 6, the seal 28 formed partly in the track 7 and the cover 22. While various seal configurations are readily adapable for use, the compound seal 28 illustrated wherein the central chamber of the seal 28 is star-shaped in cross section and two labyrinth seal configurations which preferably deter flow in opposite directions are provided extending laterally from the central portion, the star configuration presenting a greater changing surface area to act as a blockage, especially when grease filled.

A grease duct 29 formed in and through the track cover 22 leads into the central portion of the seal 28, and by employing connecting conduits (not shown) one greasing operation may lubricate both seals 28. As shown in FIG. 1, the flexible track 1 provides a fully sealed track.

Figure 10:
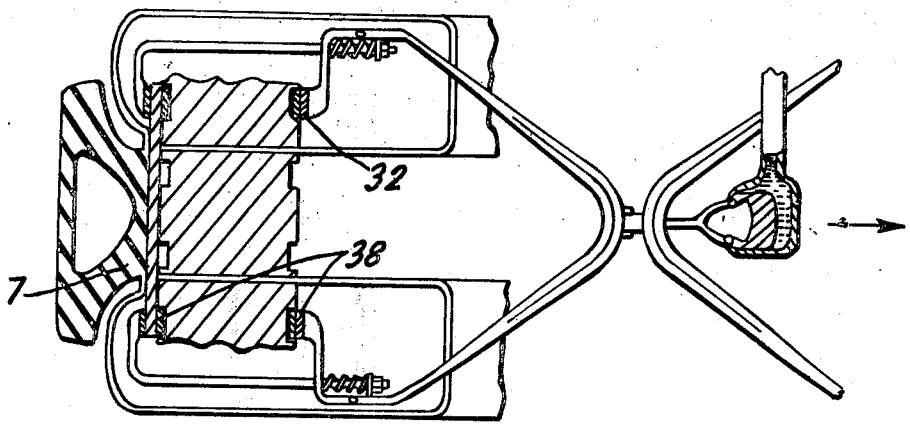
FIG. 10 is a detailed top elevational sectional view of the braking system of FIG. 7.

Although various braking systems may be employed with the flexible track 1, FIGS. 7–10 illustrate systems readily employable. As shown in FIGS. 7 and 10 a clamp type brake may be employed. As shown in FIGS. 7 and 10, the track cover 22 may extend beyond the periphery of the elliptics 2 at the front and rear of the flexible track 7 so as to provide additional space for the braking system and further to provide for both internal and external impingement of the track 7 for braking.

As most clearly shown in FIG. 1, where the brake lining 30 is shown along the upper and lower outer edges of the base portion 16 of the track 7 and FIG. 10, the braking forces are applied along the internal outer edges of the track 7 and do not interfere with the centrally disposed track teeth 13. As shown in FIG. 7, where the brakes are shown in applied position, there is provided a drum or end roller 31, a brake shoe 32, an actuating lever 33 affixed to a shaft 34 which includes a release 35, and an actuating lever 36 and hydraulic brake mechanism 37. Referring to FIG. 10, when the brakes are applied, brake shoes 32 impinge upon the brake lining 30 of the track 7.

The basic braking mechanism above described provides a compound braking and as shown in FIG. 7, the blocklike brakes may be provided at opposite end portions of the track 7 with both forward and rear brakes on a single track actuatable by the single actuating lever 36. While a simple hydraulic actuation system has been schematically shown, it is readily apparent that various other actuating means may be employed, for example, compressed air devices or electrical devices such as those known in the art.

In FIG. 8, another braking embodiment is shown. As shown, there is provided an inner and outer brake shoe 38 with lining 30 thereon, the track 7, and the end roller or drum 31. The brakes are shown in applied position. As with the braking system shown in FIG. 7 and 10, each track may be provided with a dual braking system having brakes on both the front and rear portions of the track 7. FIG. 9 is another embodiment of a compound brake of the clamp type. While the shoe 32, track 7 and end roller or drum 41 are in the same or similar positions and operate in the same or similar manner as those herein before described for FIG. 7, the application of the braking force is different. Lever 39 actuates the level links 40 to impinge the track. As in all the systems shown, the braking mechanism may be located on both the front and rear of the track and may be actuatable by a single piston hydraulic mechanism or other actuating means known in the art.

As shown in FIGS. 7 and 9, pivoting mounting of the brakes to the sheath 24 or by clamping such mounting structure to the supplemental springs 4, is desirable.

As shown in FIG. 11, the track 7 may have a rounded bearing surface 43 and the bearing surface 43 spaced apart so as to provide for a cleat-like sequence of bearing surfaces, the spacing allowing for propulsion in aquatic environments. It is apparent that other configurations, such as triangular, or squared-off bearing surfaces are within the purview of the present invention.

Figure 12:
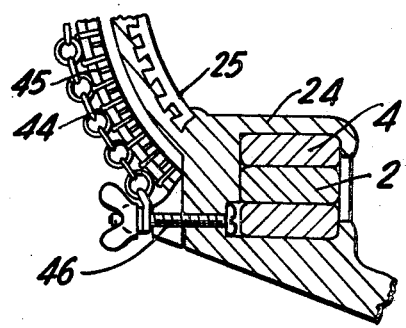
FIG. 12 is a detailed view of a flexible armor plating attached to the track of the present invention.
Figure 13:
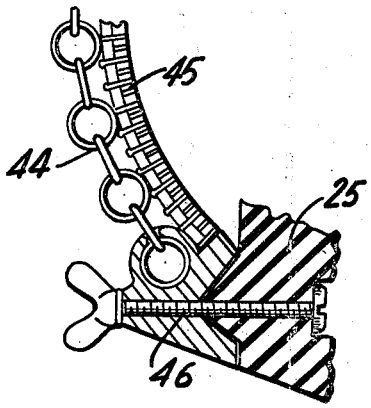
FIG. 13 is a detailed view of another flexible armor plating affixation.

FIGS. 12 and 13 illustrate in cross section one of many methods of armor plating the flexible track 1. As shown a flexible mail armor 44 is provided over a closely spaced lattice work 45 which has been mounted over the track boot 25 and affixed by a through bolt 46 to the spring sheath 24. Other flexible armor such as rubber-coated mail and/or scale arrangements or the like are similarly employable.

Figure 16:
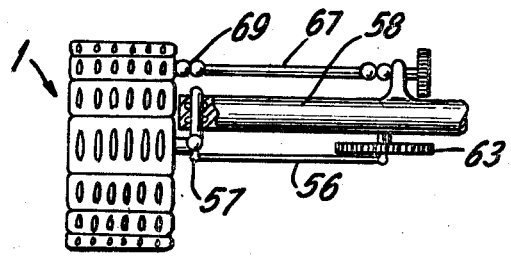
FIG. 16 is a detail of the steering and power transmission connections to the flexible track of the present invention.
Figure 14:
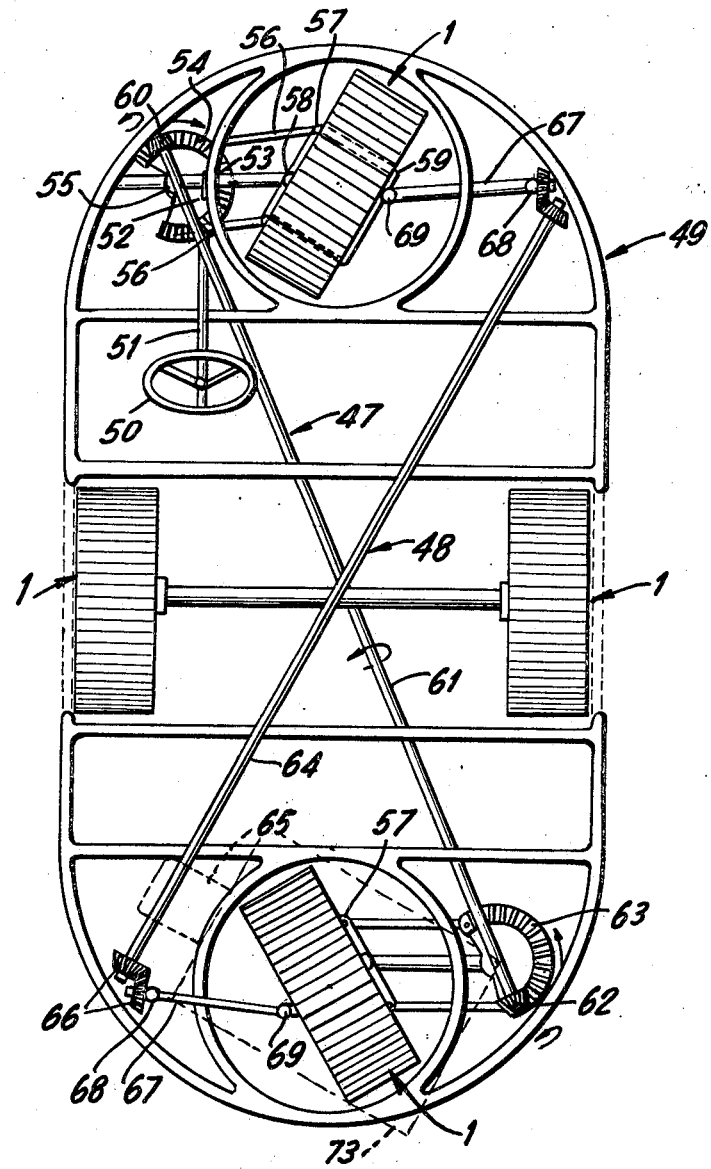
FIG. 14 is a top elevational view of the flexible track of the present invention mounted on the chassis arrangement of the present invention showing the steering means and transmission in detail.
Figure 15:
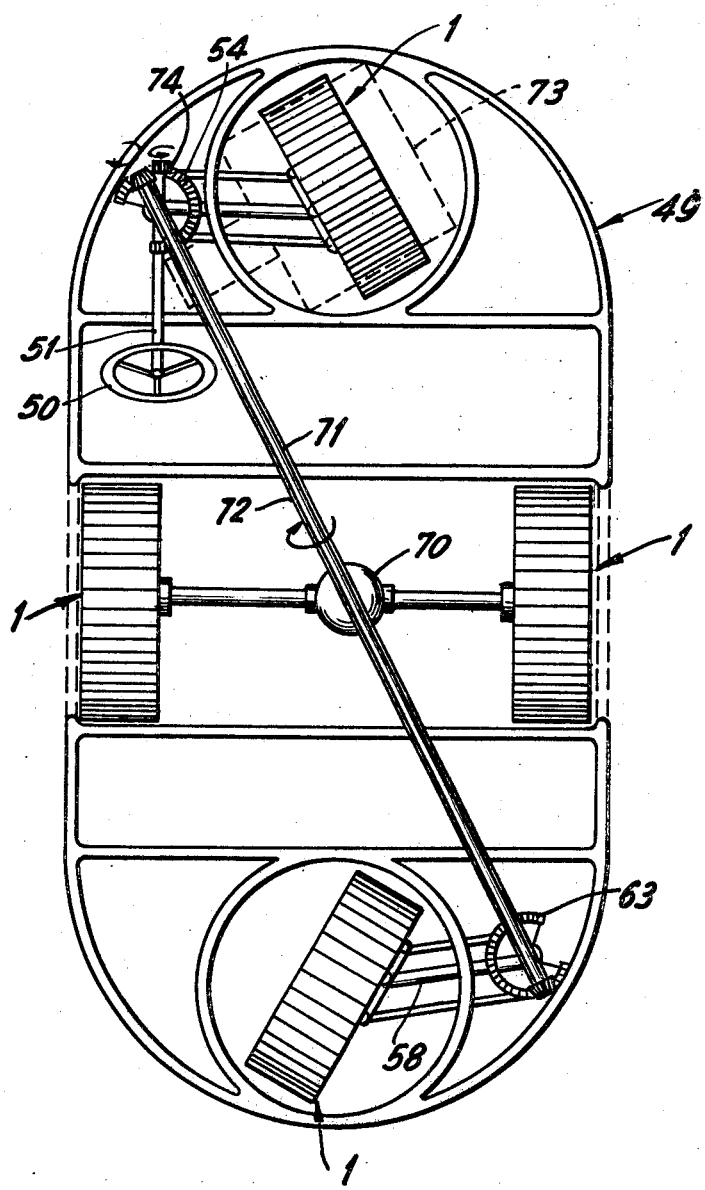
FIG. 15 is a top elevational view of another embodiment of the track and chassis configuration of FIG. 14.

Although the flexible track 1 is readily adaptable for use with commercial as well as military vehicles, it is readily suitable to the chassis arrangement shown in FIGS. 14–16.

The chassis configuration of the present invention while readily adaptable for use with the aforedescirbed flexible track 1 providing maneuverability, stability, smoothness and speed heretofore unknown for tracked vehicles is also adaptable for wheeled vehicles, half tracks or other multi-wheel and wheel and track devices, and the systems described with particular reference to the flexible track 1 are equally employable with wheels presently employed in vehicles. The positioning of the front and rear tracks or wheels so as to be centrally located at the respective front and rear peripheries of a vehicle, and the elimination of the need for a differential have equal validity whether track or wheels are employed. By positioning the front and rear tracks or wheels at the peripheral front and rear midpoints of the chassis and by the positioning of the side tracks or wheels at the midpoint of the peripheral sides of the chssis arrangement greater stability on turns, bumps and other road conditions is provided, and when combined with the steering and power transmission systems readily empolyable therewith, provides for greater maneuverability and a simplicity in construction.

Applying the chassis of the present invention to a vehicle equipped with tracks of the present invention there is provided a vehicle readily adaptable for commercial transportation as well as heavy duty and military uses.

Usually tracked vehicles are controlled or steered by changing the running speed of various of the tracks. While this type of steering may be employed with slow moving vehicles, at high speeds, or on rough terrain, it is difficult to properly steer a tracked vehicles.

While attempts have been made to provide a steering system for tracked vehicles which would turn the track in a desired manner to steer such attempts have been generally unsuccessful.

Where such attempts have been made, they neither contemplate nor make provision for the interrelationship of an interrelated power transmission system adaptable for high speed use.

According to the present invention, the front and rear tracks (or wheels) are positioned equidistant from two side tracks enabling both steering and power transmission to be effected to the front and rear tracks and pivotal steering of the tracked vehicle.

While vehicles employing six or more tracks are possible, the simplest arrangement is a four-tracked vehicle such as shown in FIGS. 14–16.

Referring to FIG. 14 there is shown a chasses arrangement constructed according to the present invention with the tracks positioned so that the central portions of the tracks describe two triangles, with the central portions at the apices of the triangles, with each track located somewhat centrally with respect to the peripheral sides of the chassis frame.

The steering system 47 and the power transmission system 48 describe an X configuration, that is, both systems 47, 48 run diagonally from an end of the frame 49 to an opposite end of the frame 49 crossing somewhat centrally, and eliminate in the two-track drive embodiment the necessity for a differential. Supporting mounting structure has not been shown for the systems 47 and 48 for purposes of clarity.

As shown in FIG. 14, the power transmission system 48 crosses above the steering system 47 and while other positioning is possible, when used in combination with the flexible tracks 1, the more elevated position of the power transmission system 48 is preferable, since the drive gear 10 as shown in FIG. 1 for the flexible track 1 is located, preferably in the upper portion of the flexible track 1.

Steering may be manually effected by ordinary means such as a steering wheel 50, although tiller-type arrangements, among others, are employable. The steering wheel shaft 51 is interconnected at a universal joint 52 to a worm gear 53. The worm gear 53 is in mesh with a horizontally disposed sector gear 54 shown as a ¾ gear, which is pivotally mounted to a lateral frame member 55.

Rods 56 are pivotally mounted to the extremities of the sector gear 54 and extend transversely to the flexible track assembly 1 where they are pivotally mounted by pivot joints 57.

The main pivot shaft 58 acts like a king pin, and is shown mounted on the inboard end of the frame member 55, and either the main pivot shaft 58 or the frame member 55 mounted to the stabilizing frame 59 of the flexible track assembly 1.

Steering is transmitted to the rear track by the sector gear 54 in mesh with gear 60 shown as a bevel gear rotating the main steering shaft 61 which rotates rear bevel gear 62 to actuate the rear sector gear 63, the rear track pivoting in the manner heretofore described with respect to the forward track.

Power is transmitted to the front and rear flexible tracks 1 on the main drive shaft 64 powered by a conventional engine 65, shown in dotted lines on the rear portion of the chassis. The main drive shaft 64 rotation is transmitted by angulated gears, shown as bevel gears 66 on both ends of the drive shaft 64, to rods 67, the rods 67 preferably having a slip universal joint 68 at its interconnection with bevel gears 66. A universal joint 69 interconnects the rod 67 to the flexible track 1, and a shaft (not shown) rotates the drive within the flexible track. The use of the slip universal joint 68 (which may be interchangeably located with universal joint 69) allows for axial movement of the rod 67 during steering.

As herein described, the tracked vehicle is driven and steered through the forward and rear tracks and the differential eliminated.

Where four-track drive is desired, such as shown in FIG. 15, a differential 70 may be employed to drive the central tracks; however, this still eliminates the use of a second differential which would ordinarily be necessitated for four-unit drive.

As shown in FIG. 15, the main steering shaft 71 and the main drive shaft 72 are parallel and run diagonally across the chassis frame 49. The engine 73 (shown schematically dotted in) is shown located at the front end portion of the chassis frame 49. The steering and driving arrangements for the front and rear tracks are similar to that heretofore described with respect to FIG. 14, it being realized that various gear arrangements and pivot mountings to effect the desired result are also employable, such as the rectifying gears 74 shown in FIG. 15 which rectifies direction of rotation and movement of the components as indicated by the arrows, or by use of a hypoid gear as a sector gear to allow greater freedom of lateral placement of the steering.

Power is transmitted to the centrally located tracks through the differential 70 by means known in the art, such as by having the ring gear of the differential 70 driven by an angle gear, such as a bevel gear on the main drive shaft 72.

FIG. 16 shows the details of the relationship of the power transmission and steering systems of FIG. 15 viewing the rear track.

There is therefore provided herein a flexible track and a flexible track and chassis combination which provides the advantages of both heavy duty rough terrain and amphibious vehicles and the maneuverability, speed and comfort of commercial vehicles.

The terms and expressions which are employed are used as terms of description; it is recognized, though that various modifications are possible within the scope of the invention claimed.

Having thus described certain forms of the invention in some detail, what is claimed is:

1. A flexible track for vehicles comprising, a pair of substantially parallel spaced apart elliptical spring-like members, means to maintain said spring-like members in said parallel spaced apart relationship, flexible support means for said flexible members, said flexible support means including; a frame adapted to be affixed at one side to a vehicle, said frame extending horizontally between said flexible members; and a plurality of shock-absorbing means mounted on said frame and bearing upon the inner periphery of said flexible members, endless track-bearing means mounted between said flexible members, an endless track belt mounted on said bearing means, and drive means adapted to engage said endless belt to drive said track.

2. The flexible track as claimed in claim 1 further including supplemental leaf springs affixed along substantially apposed arcs of said elliptical members.

3. The flexible track as claimed in claim 1 wherein said shock-absorbing means are telescoping shock absorbers.

4. The flexible track as claimed in claim 1 wherein said track-bearing means include a plurality of spaced apart roller bearings rotatably mounted between the inner edges of said flexible members.

5. The flexible track as claimed in claim 1 wherein the central underside of said endless belt includes cogs and said drive means includes at least one rotatably actuatable drive gear within said track in mesh with said cogged belt, said gear operably linked to a drive shaft; mounting bracket for said drive shaft in said track, said drive shaft mounting bracket affixed to the underside of said flexible members.

6. The flexible track as claimed in claim 1 wherein said endless belt includes; a substantially flat base; a substantially centralized cogged portion on the underside of said base; a neck portion extending upward from said base and a support portion extending from said neck portion, said support portion wider than said neck portion and adapted to act as a bearing surface for said track.

7. The flexible track as claimed in claim 6 wherein said endless belt support portion includes a plurality of pneumatic air chambers; a plurality of dead air chambers; and wherein said support portion is segmented.

8. The flexible track as claimed in claim 6 further including braking means internal of said track, wherein said braking means includes friction lining on the upper and lower edges of said flat inner base portion of said endless track, and means internal of said track adapted to engage said friction lining.

References Cited

UNITED STATES PATENTS

| | | | |
|---|---|---|---|
| 1,660,101 | 2/1928 | Smyth | 305—18 X |
| 2,337,074 | 12/1943 | Walker | 305—34 |
| 2,575,845 | 11/1951 | Singer | 305—17 X |
| 2,652,290 | 9/1953 | Bekker | 305—38 X |
| 2,900,210 | 8/1959 | Parsons | 305—17 X |
| 2,923,578 | 2/1960 | Marsh | 305—34 X |

RICHARD J. JOHNSON, Primary Examiner

U.S. Cl. X.R.

180—9.46; 305—11, 34